United States Patent [19]

Liang

[11] Patent Number: 4,952,629

[45] Date of Patent: Aug. 28, 1990

[54] THERMOPLASTIC POLYESTER BLENDS

[75] Inventor: Yeon F. Liang, Kohler, Wis.

[73] Assignee: Plastics Engineering Company, Sheboygan, Wis.

[21] Appl. No.: 281,202

[22] Filed: Dec. 7, 1988

[51] Int. Cl.$^5$ ............................................. C08L 67/02
[52] U.S. Cl. ...................................... 525/66; 525/64; 525/89; 525/92
[58] Field of Search .............................. 525/92, 66, 89

[56] References Cited

U.S. PATENT DOCUMENTS

| | | | |
|---|---|---|---|
| 4,090,996 | 5/1978 | Gergen et al. | 260/40 R |
| 4,220,735 | 9/1980 | Dieck et al. | 525/90 |
| 4,243,575 | 1/1981 | Myers et al. | 260/37 PC |
| 4,467,057 | 8/1984 | Dieck et al. | 523/212 |
| 4,491,649 | 1/1985 | Falk et al. | 525/92 |
| 4,547,547 | 10/1985 | Chen et al. | 524/538 |
| 4,578,429 | 3/1986 | Gergen et al. | 525/291 |
| 4,657,970 | 4/1987 | Shiraki | 525/57 |
| 4,797,447 | 1/1989 | Gergen | 525/92 |

*Primary Examiner*—Patricia Short
*Attorney, Agent, or Firm*—Quarles & Brady

[57] ABSTRACT

A polymer blend of superior impact resistance comprises an intimate blend of a polyalkylene terephthalate resin, a polyesteramide and an impact resistance booster which is an elastomeric block copolymer. The preferred impact resistance booster is a block copolymer which has been modified with maleic acid anhydride.

2 Claims, No Drawings

THERMOPLASTIC POLYESTER BLENDS

FIELD OF THE INVENTION

The present invention relates to polymer blends. More particularly, it relates to polymer blends of polyalkylene terephthalates, polyesteramides and a block copolymer.

BACKGROUND OF THE INVENTION

The Chen et al. U.S. Pat. No. 4,547,547 discloses that the impact resistance and crystallization velocity of polyalkylene terephthalates are improved significantly by blending a minor amount of a segmented polyesteramide with the polyalkylene terephthalates. However, there are engineering plastic applications for which it would be desirable to have polyalkylene terephthalates blends having even greater impact resistance.

SUMMARY OF THE INVENTION

It is the primary object of the present invention to disclose novel polyalkylene terephthalate blends having superior impact resistance and other properties.

It has now been discovered that the addition of a minor amount of an elastomeric block copolymer can produce an increase in the impact resistance of polyalkylene terephthalate and polyesteramide blends.

The compositions of the present invention broadly comprise blends of about 25 to about 98 parts by weight of a polyalkylene terephthalate (PAT) resin; about 1 to about 50 parts by weight of a polyesteramide (PEA); and as an impact resistance booster a minor amount of about 1 to about 25 parts by weight of an elastomeric block copolymer. The preferred block copolymer is a selectively hydrogenated block copolymer which has been modified with an acid compound or acid derivative, preferably maleic acid anhydride, disclosed in the Gergen et al. U.S. Pat. No. 4,578,429.

DESCRIPTION OF THE PREFERRED EMBODIMENT

The preferred polymer blends of the present invention preferably contain about 25 to about 98 parts by weight of a polyalkylene terephthalate, about 1 part to about 50 parts by weight of a segmented polyesteramide and about 1 part to about 25 parts by weight of a selectively hydrogenated block copolymer.

The block copolymers employed in the present invention as impact resistance boosters may have linear, radial or branched structures so long as each copolymer has at least two polymer end blocks A and at least one polymer mid block B and acid functionality. The preferred block copolymers agents are the selectively hydrogenated polymers which have been modified with maleic anhydride and which have the configuration before hydrogenation and modification of the following typical species:

polystyrene-polybutadiene-polystyrene (SBS)
 polystyrene-polyisoprene-polystyrene (SIS)
 poly(alpha-methylstyrene)-polybutadiene-poly(alpha-methylstyrene) and
 poly(alpha-methylstyrene)-polyisoprene-poly(alphamethystyrene)

Both blocks A and B may be either homopolymer or random copolymer blocks as long as each block predominates in at least one class of the monomers characterizing the blocks and as long as the A blocks individually predominate in monoalkenyl arenes and the B blocks individually predominate in dienes. The monoalkenyl arenes are styrene or alphamethylstyrene, of which styrene is preferred. The blocks B may comprise homopolymers of butadiene or isoprene and copolymers of one of these two dienes with a monoalkenyl arene as long as the blocks B predominate in conjugated diene units. When the monomer employed is butadiene, it is preferred that between about 35 and about 55 mol percent of the condensed butadiene units in the butadiene polymer block have 1,2 configuration. Thus, when such a block is hydrogenated, the resulting product is, or resembles, a regular copolymer block of ethylene and butene-1 (EB). If the conjugated diene employed is isoprene, the resulting hydrogenated product is or resembles a regular copolymer block of ethylene and propylene (EP).

The selective hydrogenation of the precursor block copolymers is preferably effected by use of a catalyst comprising the reaction products of an aluminum alkyl compound with nickel or cobalt carboxylates or alkoxides under such conditions as to substantially completely hydrogenate at least 80% of the aliphatic double bonds while hydrogenating no more than about 25% of the alkenyl arene aromatic double bonds.

The average molecular weights of the individual blocks may vary within certain limits. In most instances, the monoalkenyl arene blocks will have average molecular weights in the order of 5,000–125,000, preferably 7,000–60,000 while the conjugated diene blocks either before or after hydrogenation will have average molecular weights in the order of 10,000–300,000, preferably 30,000–150,000. The total average molecular weight of the block copolymer is typically in the order of 25,000 to about 350,000, preferably from about 35,000 to about 300,000. These molecular weights are most accurately determined by tritium counting methods or osmotic pressure measurements.

The proportion of the monoalkenyl arene blocks should be between about 8 and 55% by weight of the block copolymer, preferably between about 10 and 30% by weight.

While the average molecular weight of the individual blocks is not critical, at least within the above specified limits, it is important to select the type and total molecular weight of the block copolymer in order to ensure the compatibility necessary to get the interlocking network under the chosen blending conditions. As discussed more fully hereinafter, best results are obtained when the viscosity of the block copolymer and the engineering thermoplastic resins are substantially the same at the temperature used for blending and processing. In some instances, matching of the viscosity of the block copolymer portion and the resin portions are best achieved by using two or more block copolymers or resins. For example, a blend of two block copolymers having different molecular weights or a blend of a hydrogenated SBS and hydrogenated SIS polymers may be employed.

The block copolymers may be described as being functionally selectively hydrogenated block copolymers of the formula ABA to which has been grafted an acid compound or its derivative wherein, (1) each A is predominantly a polymerized monoalkenyl aromatic hydrocarbon block having an average molecular weight of about 2,000 to 115,000;

(2) each B prior to hydrogenation is predominantly a polymerized conjugated diene hydrocarbon clock having an average molecular weight of about 20,000 to 450,000;

(3) the blocks A constituting 5-95 weight percent of the copolymer;

(4) the unsaturation of the block B is less than 10% of the original unsaturation;

(5) the unsaturation of the A blocks is above 50% of the original unsaturation;

(6) and substantially all of the acid compounds or their derivatives are grafted to the block copolymer at secondary or tertiary carbon positions in the B blocks;

(7) and wherein said acid compounds and their derivatives are not easily polymerizable.

The preferred modifying acid compounds or derivatives are monomers and are unsaturated mono- and polycarboxylic acids with preferably at least one olefinic unsaturation. The preferred monomers are maleic anhydride, maleic acid, fumaric acid and their derivatives.

The preferred block copolymer for use in the present invention is commercially available as Kraton FG 1901X from the Shell Oil Company of Houston, Tex. In Kraton FG 1901X the acid compound grafted to the block copolymer is maleic anhydride. Methods for the preparation of such polymers are described in the Gergen et al. U.S. Pat. No. 4,578,429 which is incorporated by reference herein.

The preferred polyalkylene terephthalates have a generally crystalline structure, a melting point over about 120° C., and are thermoplastic as opposed to thermosetting. Representative polyesters are poly(ethylene terephthalate), poly(propylene terephthalate), and poly(butylene terephthalate). Stable polyblends of two or more of the polyesters, such as blends of poly(1,4-butylene terephthalate) and poly(ethylene terephthalate) also can be used. These polyesters generally have an intrinsic viscosity of at least about 0.4 dl/gram and preferably at least about 0.6 dl/gram as measured in 60:40 phenol/ tetrachloroethane mixture at 30° C. in a concentration of 0.5% by weight.

Commercially available poly(alkylene terephthalates) are available from General Electric under the tradename VALOX ® thermoplastic polyesters. Other commercial polymers include CELANEX ® from Celanese, TENITE ® from Eastman Kodak, and VITUF ® from Goodyear Chemical.

The preferred polyesteramides are those which are described U.S. Pat. No. 4,129,715, which is incorporated by reference herein.

The preferred polyesteramides are segmented polyesteramides characterized by a recurring unit of the formula:

$$\left[ B-\overset{O}{\underset{\|}{C}}-O-A-O-\overset{O}{\underset{\|}{C}} \right]_m B-$$

$$-\overset{O}{\underset{\|}{C}}\left[ NH-R-NH-\overset{O}{\underset{\|}{C}}-D-\overset{O}{\underset{\|}{C}} \right]_x NH-R-NH-\overset{O}{\underset{\|}{C}}-$$

wherein R is selected from the class consisting of arylene of the formulae:

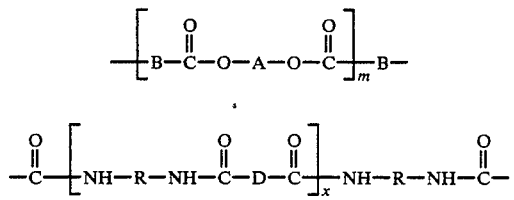

and mixtures thereof, A is the residue of a polymeric diol HO—A—OH having a molecular weight from about 400 to about 4000 B is the residue of a dicarboxylic acid HOOC—B—COOH selected from the class consisting of aliphatic dicarboxylic acids having from 60 to 14 carbon atoms, inclusive, and isophthalic and terephthalic acids, m has a mean value of not more than 1 but greater than 0, D is the residue of a dicarboxylic acid HOOC—D—COOH such that the melt temperature of the hard segment is not greater than 280° C., and x is a number having an average value from zero to 10.

A preferred group of polyesteramides for use in preparing the polymer blends of the invention are those having the recurring unit of formula (1) wherein A is the residue of a polyesterdiol HO—A—OH, which polyesterdiol is the hydroxyl-terminated product of reaction of adipic, azelaic or 1,12-dodecanoic acid with an excess of 1,4-butanediol or 1,6-hexanediol, and B and D are the residues of adipic or azelaic acids.

The proportions in which the terephthalate polymer, the polyesteramide component and the block copolymer are employed in the blends is generally within the range of about 25 to about 98 percent by weight of the polyester, about 1 to about 50 percent of the polyesteramide and the remainder of the blend being the block copolymer. A preferred range of proportions is from 60 percent to 95 percent of the polyester, from 3 to 25 percent of the polyesteramide and from about 2 to 15 percent of the block copolymer.

The polymer blends of the instant invention may be compounded further with other polymers, oils, fillers, reinforcements, antioxidants, stabilizers, fire retardants, antiblocking agents and other rubber and plastic compounding ingredients without departing from the scope of this invention.

Examples of various fillers that can be employed are in the 1971-72 Modern Plastics Encyclopedia, pages 240-247. Reinforcements are also very useful in the present polymer blends. A reinforcement may be defined simply as the material that is added to a resinous matrix to improve the strength of the polymer. Most of these reinforcing materials are inorganic or organic products of high molecular weight. Various examples include glass fibers, asbestos, boron fibers, carbon and graphite fibers, whiskers, quarts and silica fibers, ceramic fibers, metal fibers, natural organic fibers, and synthetic organic fibers. In some instances it may be advantageous to use coupling agents, such as various silanes, in the preparation of the reinforced blends.

The blends can be prepared in any convenient manner. For example, by bringing together the components in solid form and dry-blending using conventional means such as a barrel mixer, a tumble mixer, and the like. Alternatively, the components are brought together and fluxed in an appropriate mixing apparatus such as a Banbury type internal mixer, rubber mill twin screw compounder and the like. Preferably, the components are brought together and processed in an appropriate melt extruder from which the blend is extruded in the form of strands and the like which are then pelletized for injection molding purposes. Standard techniques and apparatus well-known in the art can be used for these purposes.

The polymer blends of the instant invention are prepared by blending the components until a uniform composition is obtained. The resulting compositions can be employed for any use typically performed by engineering thermoplastics, such as metal replacements and those areas where high performance is necessary.

To illustrate the instant invention, a number of illustrative examples are given. It is to be understood, however, that the examples are for the purpose of illustration only and the invention is not to be limited except by the claims.

EXAMPLES 1–6

The following examples illustrate the combination of a polyethylene terephthalate (PET), and polyesteramide (PEA) and the improvement in impact strength.

The various blends were prepared using a polyethylene terephthalate (PET), and a polyesteramide (XUS 63115.00, a linear segmented thermoplastic from Dow Chemical). The formulations are as follows:

| Parts by Wt. | Examples | | | | | |
|---|---|---|---|---|---|---|
| | 1 | 2 | 3 | 4 | 5 | 6 |
| PET | 100 | 100 | 100 | 100 | 100 | 100 |
| PEA | — | 5 | 10 | 15 | 20 | 25 |

All components were tumble mixed until a uniform composition was obtained. The blends were extruded at 230–240° C. and pelletized. Test specimens were obtained by injection molding the dried pellets at barrel temperatures of 230°–240° C. and die temperature of 60° C. Physical testings were performed and the results followed:

| Properties | Examples | | | | | |
|---|---|---|---|---|---|---|
| | 1 | 2 | 3 | 4 | 5 | 6 |
| Unnotched Izod Impact, ft-lb/in | NB* | 31.38 | NB | NB | NB | NB |
| Notched Izod Impact, ft-lb/in | 0.55 | 0.68 | 0.78 | 0.80 | 0.98 | 1.02 |
| Heat Deflection Temp., 264 psi, °F. | 156 | 154 | 152 | 151 | 151 | 153 |
| Tensile Strength, psi | 7839 | 7632 | 7149 | 6624 | 6259 | 6135 |
| Flexural Strength, psi | 14179 | 14261 | 14097 | 13267 | 12721 | 13383 |

*no break

The above examples show that the notched Izod impact strength of PET is improved with the addition of rubbery polyesteramide, the extent of toughening is increased somewhat proportionally with the amount of PEA used. It should be noted that other properties, such as heat deflection temperature, tensile strength, and flexural strength, are not significantly affected by the presence of PEA.

EXAMPLES 7–12

The following examples illustrate the increase in impact strength resulting from the use of a non-acid modified block copolymer in PET/PEA blends. The block copolymer was Kraton G1652, a styrene-ethylene-butylene-styrene block copolymer from Shell Chemical Co. The compositions are given below:

| Parts by Wt. | 7 | 8 | 9 | 10 | 11 | 12 |
|---|---|---|---|---|---|---|
| PET | 100 | 100 | 100 | 100 | 100 | 100 |
| PEA | — | 5 | 10 | 15 | 20 | 25 |
| Kraton G1652 | 5 | 5 | 5 | 5 | 5 | 5 |

The blends were extruded and molded in accordance with the procedure of Example 1. The properties are as follows:

| Properties | 7 | 8 | 9 | 10 | 11 | 12 |
|---|---|---|---|---|---|---|
| Unnotched Izod Impact, ft-lb/in | 14.71 | 28.01 | NB* | NB | NB | NB |
| Notched Izod Impact ft-lb/in | 0.61 | 0.71 | 0.93 | 0.91 | 1.30 | 1.74 |
| Heat Deflection Temp., 264 psi, °F. | 156 | 153 | 154 | 155 | 154 | 155 |
| Tensile Strength psi | 7712 | 7200 | 6752 | 6406 | 6080 | 5877 |
| Flexural Strength psi | 14015 | 13545 | 12819 | 12376 | 11184 | 10946 |

As can be seen, the impact strength of PET/PEA/Kraton ternary blends with higher loading of PEA (Exs. 11 and 12) are synergistically improved by small amounts of the Kraton with no significant reduction in other properties.

Surprisingly, the addition of the Kraton 61652 did not cause any reduction in heat deflection temperature.

EXAMPLES 13–18

The following examples demonstrate the synergistic effect of the addition of a functionalized block copolymer (Kraton FG 1901X, Shell) on the impact resistance of PET/PEA blends. The formulations are shown below.

| Parts by Wt. | 13 | 14 | 15 | 16 | 17 | 18 |
|---|---|---|---|---|---|---|
| PET | 100 | 100 | 100 | 100 | 100 | 100 |
| PEA | 0 | 5 | 10 | 15 | 20 | 25 |
| Kraton FG 1901X | 5 | 5 | 5 | 5 | 5 | 5 |

The blends were extruded and molded in accordance with the procedure of Example 1. The testing results are shown below.

| Properties | 13 | 14 | 15 | 16 | 17 | 18 |
|---|---|---|---|---|---|---|
| Unnotched Izod Impact, ft-lb/in | NB* | NB | NB | NB | NB | NB |
| Notched Izod Impact, ft-lb/in | 0.77 | 0.95 | 1.26 | 1.55 | 2.22 | 2.25 |
| Heat Deflection Temp., 264 psi, °F. | 156 | 155 | 152 | 153 | 152 | 152 |
| Tensile Strength, psi | 7433 | 7142 | 6774 | 6246 | 5813 | 5752 |
| Flexural Strength, psi | 15206 | 13948 | 12739 | 12059 | 12458 | 11238 |

*no break

THERMOPLASTIC POLYESTER TERNARY BLENDS

The addition of Kraton FG 1901X to the PET/PEA (100/5) blend in Example 14 results in a 40% increase in notched Izod impact strength. The extent of improvement is exactly the same as adding Kraton FG 1901X to PET alone (Examples 1 and 13). Therefore, the impact improvement on Example 14 is the additive effect of PEA and Kraton FG 1901X. At higher loading of PEA in Examples 15-18, however, the magnitude of impact enhancement achieved by Kraton FG 1901X is greater than the combination of the effects taken independently. In other words, the cooperative action of Kraton FG 1901X and PEA produces a synergistic effect on impact strength improvement in Examples 15-18. Like previous examples, heat deflection temperature is not adversely affected.

EXAMPLES 19-22

The following examples are the blends of polybutylene terephthalate, PBT (Valox 310, General Electric) with PEA. The formulations are given below.

|  | Examples | | | |
| --- | --- | --- | --- | --- |
| Parts by Wt | 19 | 20 | 21 | 22 |
| PBT | 100 | 100 | 100 | 100 |
| PEA | — | 5 | 10 | 15 |

The blends were extruded and molded in accordance with the procedure of previous examples. The testing results are as follows:

|  | Examples | | | |
| --- | --- | --- | --- | --- |
| Properties | 19 | 20 | 21 | 22 |
| Notched Izod Impact, ft-lb/in | 0.84 | 0.84 | 1.15 | 1.17 |
| Heat Deflection Temp., 264 psi, °F. | 128 | 129 | 129 | 127 |
| Tensile Strength, psi | 7473 | 6969 | 6357 | 5662 |
| Flexural Strength, psi | 17432 | 16327 | 15268 | 14575 |

As in the case of PET/PEA blends (Examples 1-6), the impact strength of PBT is improved with the addition of PEA.

EXAMPLES 23-26

The following examples show the effect of Kraton G1652 on PBT/PEA blends. The formulations are as follows:

|  | Examples | | | |
| --- | --- | --- | --- | --- |
| Parts by Wt | 23 | 24 | 25 | 26 |
| PBT | 100 | 100 | 100 | 100 |
| PEA | — | 5 | 10 | 15 |
| Kraton G1652 | 5 | 5 | 5 | 5 |

The blends were extruded and molded in accordance with the procedure of previous examples. The testing results are shown below:

|  | Examples | | | |
| --- | --- | --- | --- | --- |
| Properties | 23 | 24 | 25 | 26 |
| Notched Izod Impact, ft-lb/in | 1.26 | 1.46 | 1.52 | 1.81 |
| Heat Deflection Temp., 264 psi, °F. | 129 | 127 | 127 | 123 |
| Tensile Strength, psi | 6512 | 6107 | 5723 | 5466 |
| Flexural Str., psi | 15847 | 14783 | 14359 | 12598 |

The presence of Kraton G1652 gives a synergistic effect on the impact strength of most PBT/PEA blends (Examples 24 and 26). An additive effect is obtained on Example 25.

EXAMPLES 27-30

The following examples depict the synergistic effect on impact strength of PET/PEA blends resulting from the incorporation of Kraton FG 1901X. The formulations are as follows:

|  | Examples | | | |
| --- | --- | --- | --- | --- |
| Parts by Wt | 27 | 28 | 29 | 30 |
| PBT | 100 | 100 | 100 | 100 |
| PEA | — | 5 | 10 | 15 |
| Kraton FG 1901X | 5 | 5 | 5 | 5 |

The blends were extruded and molded in accordance with the procedure of previous examples. The testing results are listed below.

|  | Examples | | | |
| --- | --- | --- | --- | --- |
| Properties | 27 | 28 | 29 | 30 |
| Notched Izod Impact, ft-lb/in | 1.17 | 1.50 | 1.62 | 1.97 |
| Heat Deflection Temp., 264 psi, °F. | 130 | 127 | 129 | 127 |
| Tensile Strength, psi | 6750 | 6344 | 6094 | 5875 |
| Flexural Str., psi | 16281 | 15344 | 14210 | 13681 |

The extent of synergism obtained from Kraton FG 1901X is greater than that from Kraton G 1652. This is true for both PBT and PET systems. Again, tensile and flexural strengths are not significantly sacrificed. Heat deflection temperature is essentially not changed.

Kraton FG 1901X thermoplastic elastomer is a maleic anhydride functionalized triblock copolymer consisting of polystyrene end blocks and poly(ethylene/butylene) midblocks. It is believed that the maleic anhydride functionality in Kraton FG 1901X chemically reacts with both thermoplastic polyester and the polyesteramide to form a grafted multiblock structure. In this case, Kraton FG 1901X may actually function as a molecular bridge or coupling agent.

It is surprising that the Kraton FG 1901X is more effective than the conventional Kraton rubber, Kraton G 1652, because the Kraton G 1652 is a more effective impact modifier for PBT alone than the functionalized Kraton FG 1901X. In case of PET/PEA or PBT/PEA blends, Kraton G 1652 does show a significant improvement in impact strength compared to the straight blend without a modifier. However, Kraton FG 1901X exhibits unexpectedly superior improvements not only in impact strength, but also in heat deflection temperature. The combination of these advantages really demonstrate the uniqueness of a selectively hydrogenated acid modified copolymer (e.g. Kraton FG 1901X) as a powerful modifier for thermoplastic polyester/polyesteramide blends.

It will be apparent to those skilled in the art that the foregoing examples have been for illustrative purposes and that a number of modifications and changes can be made without departing from the spirit and scope of the invention. Therefore, it is intended that the invention be limited only by the claims.

What is claimed is:

1. A polymer blend of improved impact resistance comprising:
    (a) about 100 parts by weight of a polyethylene terephthalate;
    (b) at least about 10 to about 25 parts by weight of a linear segmented thermoplastic polyesteramide; and
    (c) about 5 parts by weight of a block copolymer selected from a styrene/ethylene butylene/styrene triblock copolymer and a styrene/ethylene-butylene/styrene maleic anhydride functionalized triblock copolymer; said blend containing about 20 to 25 parts by weight of the polyesteramide when the block copolymer is a styrene/ethylene-butylene/styrene triblock copolymer and about 10 to about 25 parts by weight of said polyesteramide when the block copolymer is a styrene/ethylene-butylene/styrene maleic anhydride triblock copolymer.

2. A polymer blend of improved impact resistance comprising:
    (a) about 100 parts by weight of a polybutylene terephthalate;
    (b) at least about 5 to about 15 parts by weight of a linear segmented thermoplastic polyesteramide; and
    (c) about 5 parts by weight of a styrene/ethylene-butylene/styrene maleic anhydride functionalized triblock copolymer.

* * * * *